UNITED STATES PATENT OFFICE.

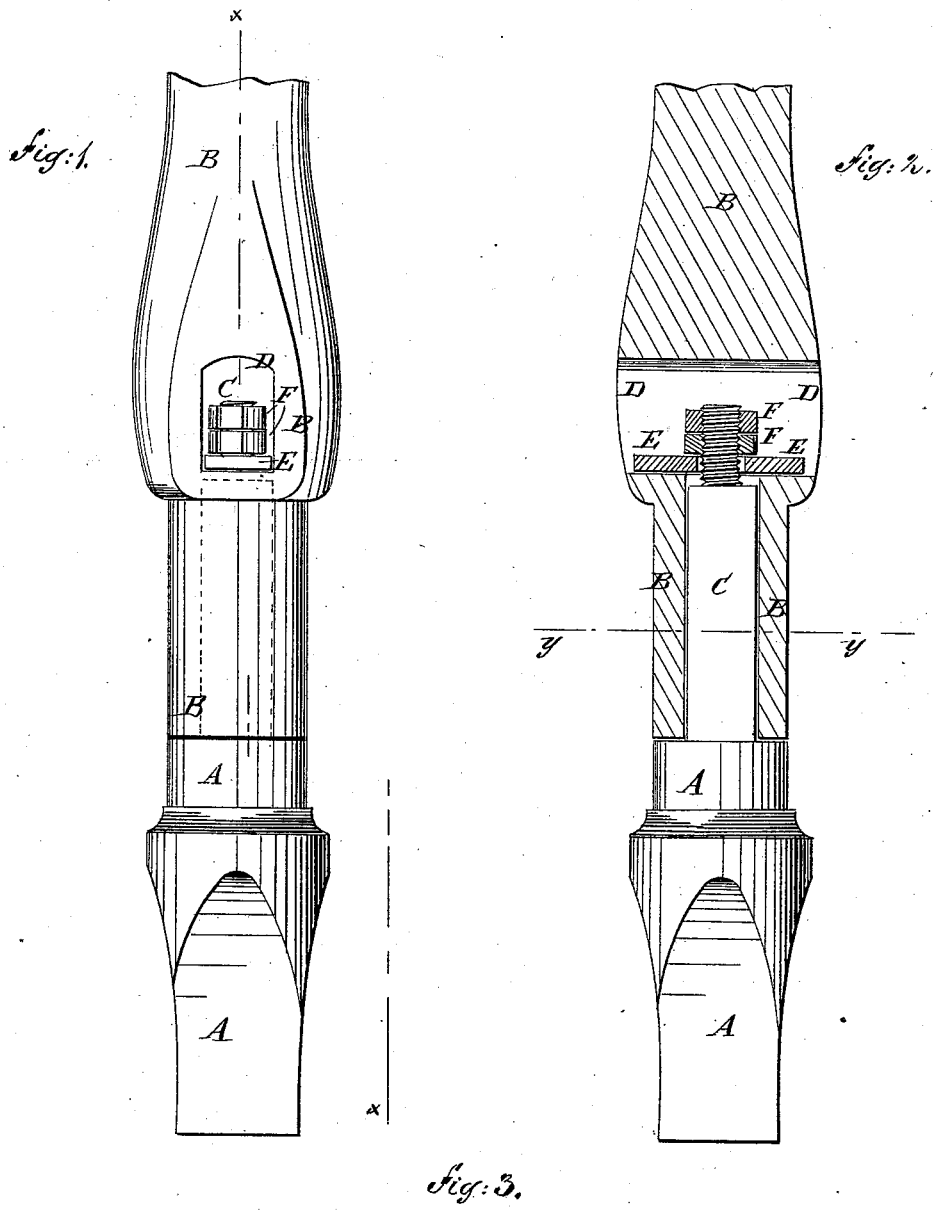

JOHN H. SUTFIN, OF LAS VEGAS, TERRITORY OF NEW MEXICO.

COUPLING FOR EARTH-AUGERS AND ROCK-DRILLS.

SPECIFICATION forming part of Letters Patent No. 237,629, dated February 8, 1881.

Application filed November 27, 1880. (No model.)

*To all whom it may concern:*

Be it known that I, JOHN HENDERSON SUTFIN, of Las Vegas, in the county of San Miguel and Territory of New Mexico, have invented a new and useful Improvement in Couplings for Earth-Augers and Rock-Drills, of which the following is a specification.

Figure 1 is a side elevation of the improvement. Fig. 2 is a sectional side elevation through the line $x\ x$, Fig. 1. Fig. 3 is a cross-section taken through the line $y\ y$, Fig. 2.

Similar letters of reference indicate corresponding parts.

The object of this invention is to furnish couplings for earth-augers and rock-drills which shall be so constructed that the bits can be easily and quickly detached from the shafts, so as to avoid the loss of time which is unavoidable when the bits are secured in the ordinary manner.

The invention consists in constructing a coupling for earth-augers and rock-drills of a bit having a shank flattened upon one or more sides and a screw-thread upon its end, a shaft having a correspondingly-shaped perforation in its lower end to receive the shank of the bit and a short longitudinal slot formed through it at the end of its perforation, and a washer and nuts placed upon the end of the bit-shank within the slot of the shaft, as will be hereinafter fully described.

In the accompanying drawings, A represents the bit, and B the shaft, of a well-auger or rock-drill. The upper part or shank, C, of the bit A is made square, or is flattened upon one or more sides, and is inserted in a similarly-shaped perforation in the end of the shaft B.

Through the shaft B, opposite the upper end of the shank C, is formed a short longitudinal slot, D, into which the end of the shank C projects.

The end of the shank C has a screw-thread cut upon it, and upon the said end is placed a washer, E, which rests upon the bottom of the slot D, and is made of such a shape and size as to fit into the said slot D.

Upon the end of the shank C, above the washer E, are screwed two nuts, F, to hold the bit A securely in place. With this construction the bit A can be detached from the shaft B by simply unscrewing the nuts F.

Having thus described my invention, I claim as new and desire to secure by Letters Patent—

In an auger or drill coupling, the combination, with a bit-shank, C, having a threaded end, the washer E, and one or more nuts, F, of the shaft B, having a longitudinal slotted portion that surrounds the unthreaded part of said shank, and a cross-slot, D, as and for the purpose described.

JOHN HENDERSON SUTFIN.

Witnesses:
GEORGE F. CARRIS,
T. J. KENNEDY.